United States Patent [19]
Milroy

[11] Patent Number: 6,075,522
[45] Date of Patent: Jun. 13, 2000

[54] DESKTOP COMPACT CURSOR CONTROLLER STRUCTURE FOR USE WITH COMPUTERS AND KEYBOARDS

[75] Inventor: Mark N. Milroy, Rawlins, Wyo.

[73] Assignee: Altra Corporation, Rawlins, Wyo.

[21] Appl. No.: 09/048,936

[22] Filed: Mar. 26, 1998

[51] Int. Cl.[7] .................................................. G06F 3/033
[52] U.S. Cl. ........................................ 345/184; 345/157
[58] Field of Search .................................. 345/157, 160, 345/184; 341/16

[56] References Cited

U.S. PATENT DOCUMENTS

| | | | |
|---|---|---|---|
| 4,670,743 | 6/1987 | Zemke | 345/157 |
| 5,400,054 | 3/1995 | Dorst | 345/157 |
| 5,704,037 | 12/1997 | Chen | 345/184 |
| 5,760,764 | 6/1998 | Martinelli | 345/160 |
| 5,790,108 | 8/1998 | Salcudean et al. | 345/184 |

*Primary Examiner*—Jeffery Brier
*Attorney, Agent, or Firm*—Flehr Hohbach Test Albritton & Herbert LLP

[57] ABSTRACT

A desktop compact cursor controller includes a platform having a protrusion thereon. A housing is coupled to the platform and has a structure configured to accept the protrusion, where the structure includes a first slidable member having a first brush configured to move in response to movement of the housing and a second slidable member having a second brush configured to move in response to movement of the housing. A printed circuit board is disposed within the housing and electrically coupled to the first brush and the second brush and configured to generate a first sensor signal in response to movement of the first brush on a first conductive strip and to generate a second sensor signal in response to movement of the second brush on a second conductive strip oriented perpendicular to the first conductive strip. A processor is coupled to the first conductive strip and the second conductive strip and configured to receive the first sensor signal and the second sensor signal to determine a position of the housing with respect to the platform. The processor then sends a position signal to a computer. Advantages of the invention include compact size and a high degree of accurate cursor control. Moreover, the invention provides good ergonomics that reduces fatigue.

19 Claims, 6 Drawing Sheets

DESKTOP COMPACT CURSOR CONTROLLER STRUCTURE FOR USE WITH COMPUTERS AND KEYBOARDS

FIELD

The present invention relates to a desktop compact cursor controller structure for use with computers and keyboards. In particular, the invention can be used with computers to provide a cursor controller having improved comfort of use and accuracy of cursor control over existing mouse, joystick, track-ball, touch pad, and other conventional technologies.

BACKGROUND

Known types of cursor controllers for computers include a mouse, a joystick, a track-ball and a touch pad that responds to a user's finger impressions. While a mouse provides a degree of accuracy, it also requires a fair amount of desk space. The joystick, track-ball and touch pad have an advantage over a conventional mouse because these require less desk space. However, these devices do not provide the same high degree of cursor control on the display that can be obtained with a mouse. For example, a mouse is preferred for drafting figures where position of the cursor must be accurately controlled. Thus, a limitation of known cursor controllers is that they either require a fair amount of desk space or do not provide sufficient control over the accuracy of the cursor on the computer display.

A goal of the invention is to overcome the identified limitations and to provide a desktop cursor controller that combines both small size and a high degree of accurate cursor control.

SUMMARY

The invention overcomes the identified problems and provides a desktop cursor controller with fast, comfortable and accurate cursor control. An exemplary embodiment of a desktop compact cursor controller includes a platform having a protrusion thereon. A housing is coupled to the platform and has a structure configured to accept the protrusion, where the structure includes a first slidable member having a first brush configured to move in response to movement of the housing and a second slidable member having a second brush configured to move in response to movement of the housing. A printed circuit board is disposed within the housing and electrically coupled to the first brush and the second brush and configured to generate a first sensor signal in response to movement of the first brush on a first conductive strip and to generate a second sensor signal in response movement of the second brush on a second conductive strip oriented perpendicular to the first conductive strip. A processor is coupled to the first conductive strip and the second conductive strip and configured to receive the first sensor signal and the second sensor signal to determine a position of the housing with respect to the platform. The processor then sends a position signal to a computer.

In one embodiment, the platform is approximately 9 cm wide and 8 cm deep, and the housing is approximately 5.7 cm wide, 5.7 cm deep and 1.5 cm high. This small design allows the controller to be manipulated by the user by moving his fingers and without moving the wrist. Since the structure is small and has low mass, the fingers can easily manipulate the structure. This configuration is very ergonomic and reduces fatigue and repetitive motion problems with the user.

Advantages of the invention include compact size and a high degree of accurate cursor control. Moreover, the invention provides good ergonomics that reduces fatigue.

BRIEF DESCRIPTION OF THE FIGURES

Additional advantages of the invention will become apparent upon reading the following detailed description and upon reference to the drawings, in which.

DETAILED DESCRIPTION

Exemplary embodiments are described with reference to specific configurations and dimensions. Those skilled in the art will appreciate that various changes and modifications can be made while remaining within the scope of the claims.

Figure 1:
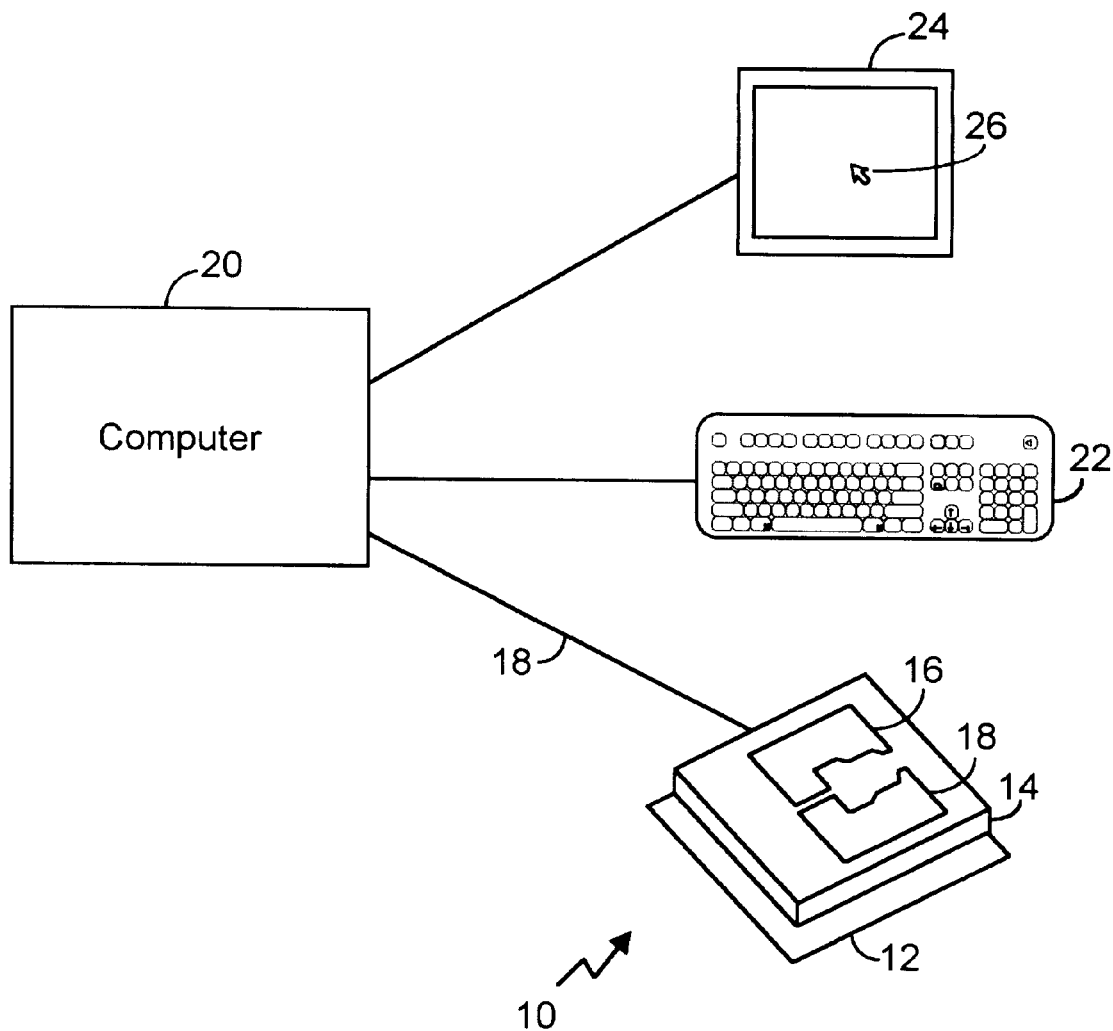
FIG. 1 depicts a computer using a desktop cursor controller according to an embodiment of the invention.

FIG. 1 depicts a compact cursor controller 10 according to an embodiment of the invention. Controller 10 includes a platform 12 and a housing 14. The housing includes a first switch 16 and a second switch 18 for user selection. The housing is coupled via cable 18 to a computer 20. The computer is also coupled to a keyboard 22 and display 24. The display has a display cursor 26 that serves to highlight a position on the display. The invention provides that manipulation of the housing 14 on the platform 12 by the user causes the cursor 26 to be correspondingly manipulated by the computer 20 on the display 24. Such function is known in the art and is described, for example, in U.S. Pat. No. 4,935,728, incorporated herein by reference.

The invention focuses on the physical structure of the compact cursor controller 10. As shown in FIG. 1, the invention can be configured as a desktop stand alone unit as a replacement for a mouse and communicate with the computer over cable 18. Alternatively, the invention can be incorporated into a keyboard for use with a desktop computer. The cursor controller can be positioned adjacent to the keyboard, as shown, or can alternately be placed in any region on the keyboard surface such as above the keyboard or the right or left of the keyboard, or can alternately be placed on a region that extends from or pops-out from the keyboard area. If the invention is incorporated into a keyboard or into a laptop, notebook or hand-held computer, the invention can use a connector that couples directly to an internal printed circuit board, such as the motherboard, eliminating the need for cable 18.

Figure 2:
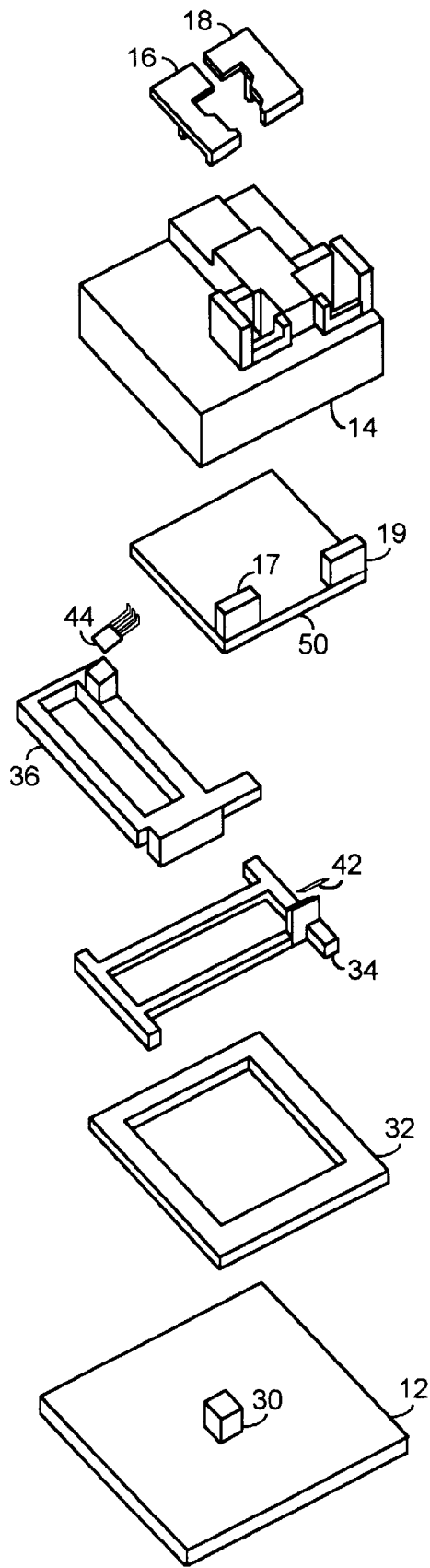
FIG. 2 depicts an exploded view of a controller structure according to an embodiment of the invention.
Figure 3:
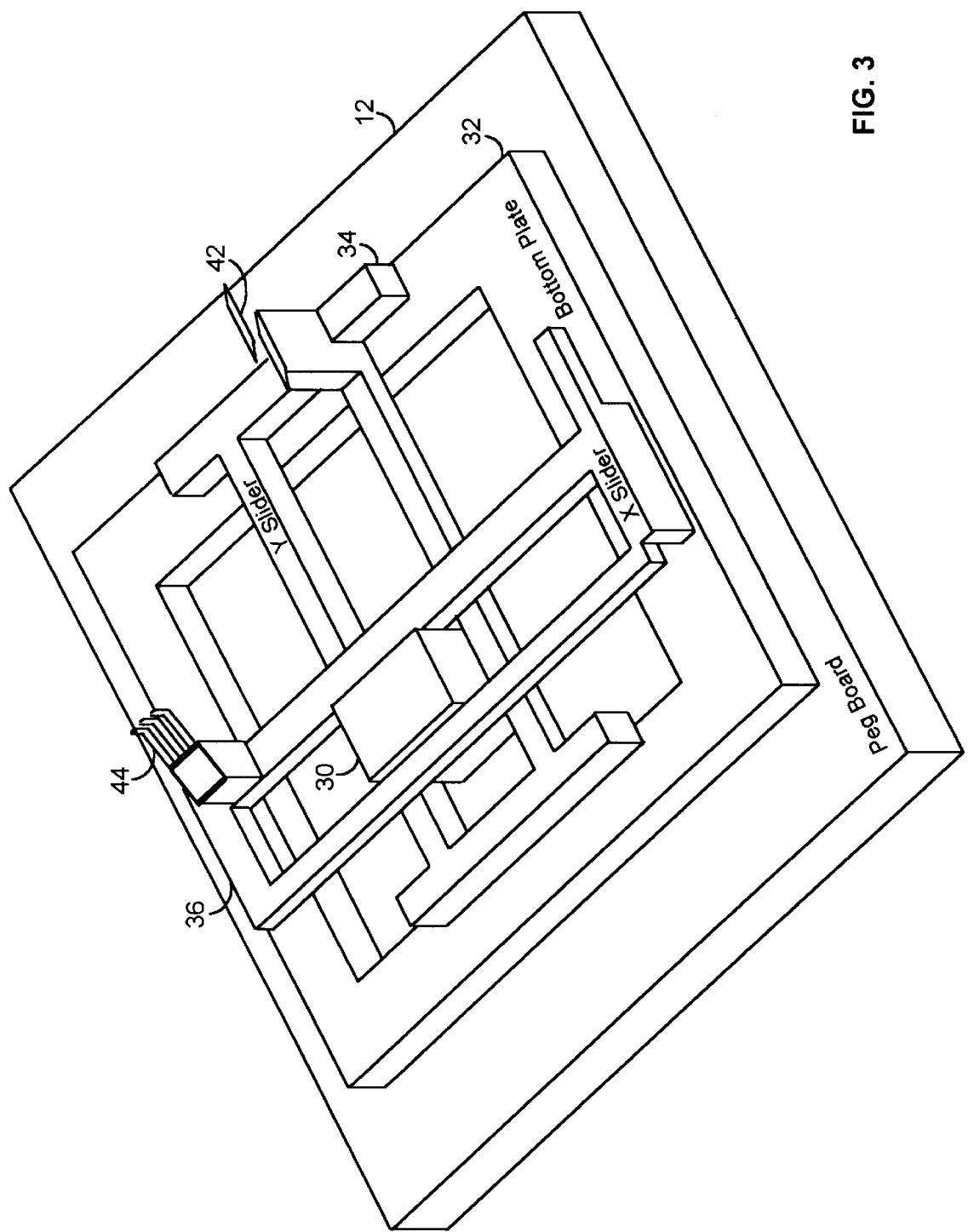
FIG. 3 depicts a partially assembled view of a controller structure according to an embodiment of the invention.
Figure 4:
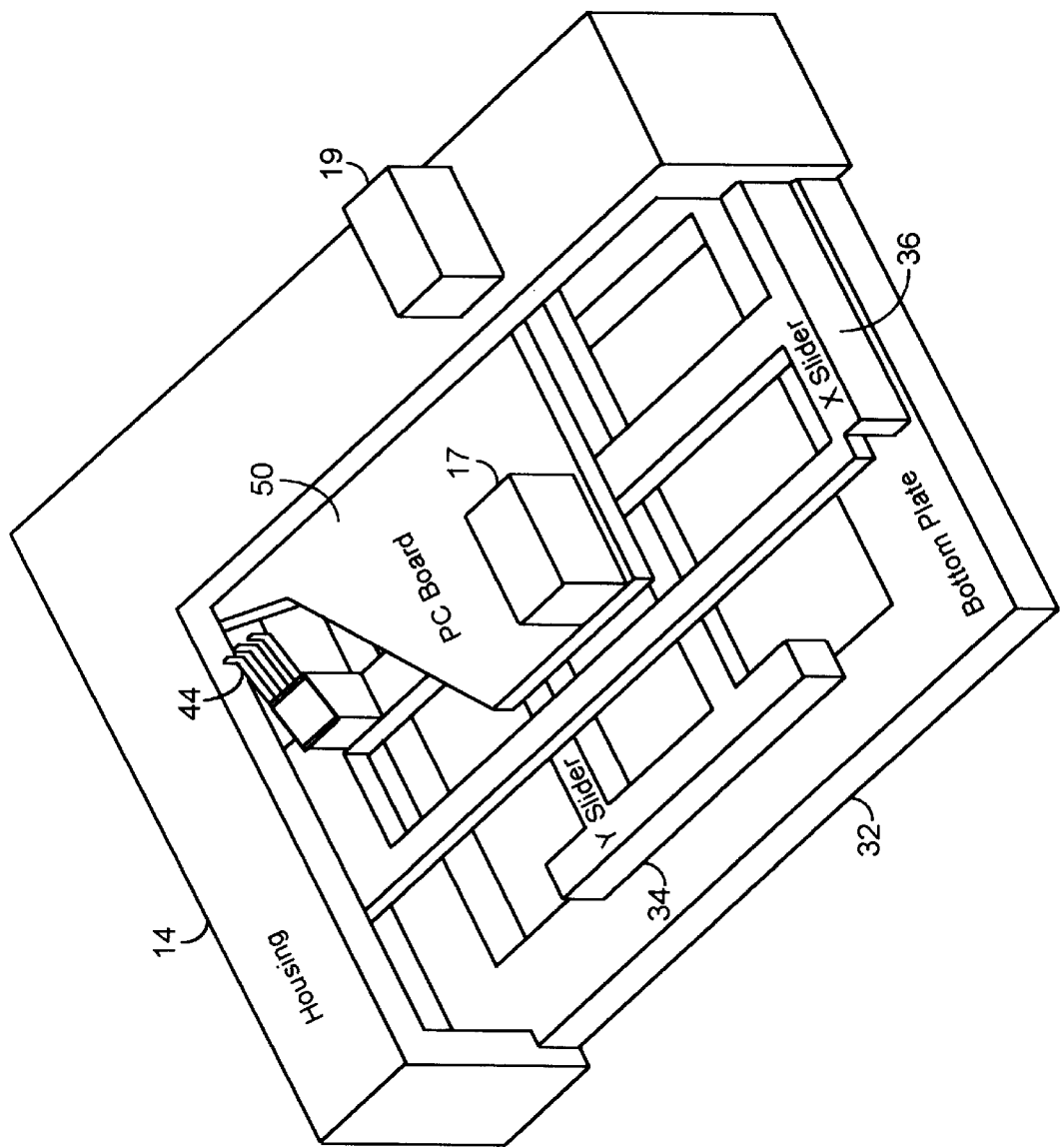
FIG. 4 depicts a partially assembled view of a controller structure according to an embodiment of the invention.

FIGS. 2–4 depict an exploded view and partially assembled views of a controller structure according to an embodiment of the invention. The controller structure is intended to fit substantially within housing 14. Platform 12 includes a protrusion 30 that connects through a plate 32 to an opening in a first slidable member 34 having a first brush 42. The protrusion 30 also connected through plate 32 to an opening in a second slidable member 36 having a brush 44.

The slidable members 34 and 36 are moveable in response to movement of the housing on the platform. The position of the slidable members is shown in FIG. 3. Note that the protrusion 30 fits into openings in slidable members 34 and 36 and permits free movement of the slidable members based on a relative movement between the housing 14 (holding the slidable members) and the platform 12. The brushes 42 and 44 are electrically coupled to a printed circuit board 50, described in detail below. The back side of the printed circuit board 50 supports a two switch protrusions 17 and 19. The switch protrusions include pressure sensitive switches that are activated by the user by pressing on buttons 16 and 18 respectively. FIG. 4 shows how the brushes 42 (not shown) and 44 contact the printed circuit board 50 and how switch protrusion 17 and 19 are configured above the printed circuit board.

The invention is designed to be compact. As such, in one embodiment, the dimensions for the platform is approximately 9 cm wide and 8 cm deep, and the housing is approximately 5.7 cm wide, 5.7 cm deep and 1.5 cm high. In another embodiment, the dimensions for the platform is less than approximately 9 cm wide and 8 cm deep, and the housing is less than approximately 5.7 cm wide, 5.7 cm deep and 1.5 cm high In operation when the housing is moved on the platform 12, the protrusion 30 remains in a constant position, and slidable members 32 and 34 are moved respectively. The slidable members are coupled to brushes 42 and 44. The result is that the brushes become uniquely positioned for each unique housing position. The printed circuit board 50 is positioned above the brushes 42 and 44 and attached to the housing 14. The printed circuit board includes features that can identify the positions of the brushes 42 and 44, as explained below.

Figure 5:
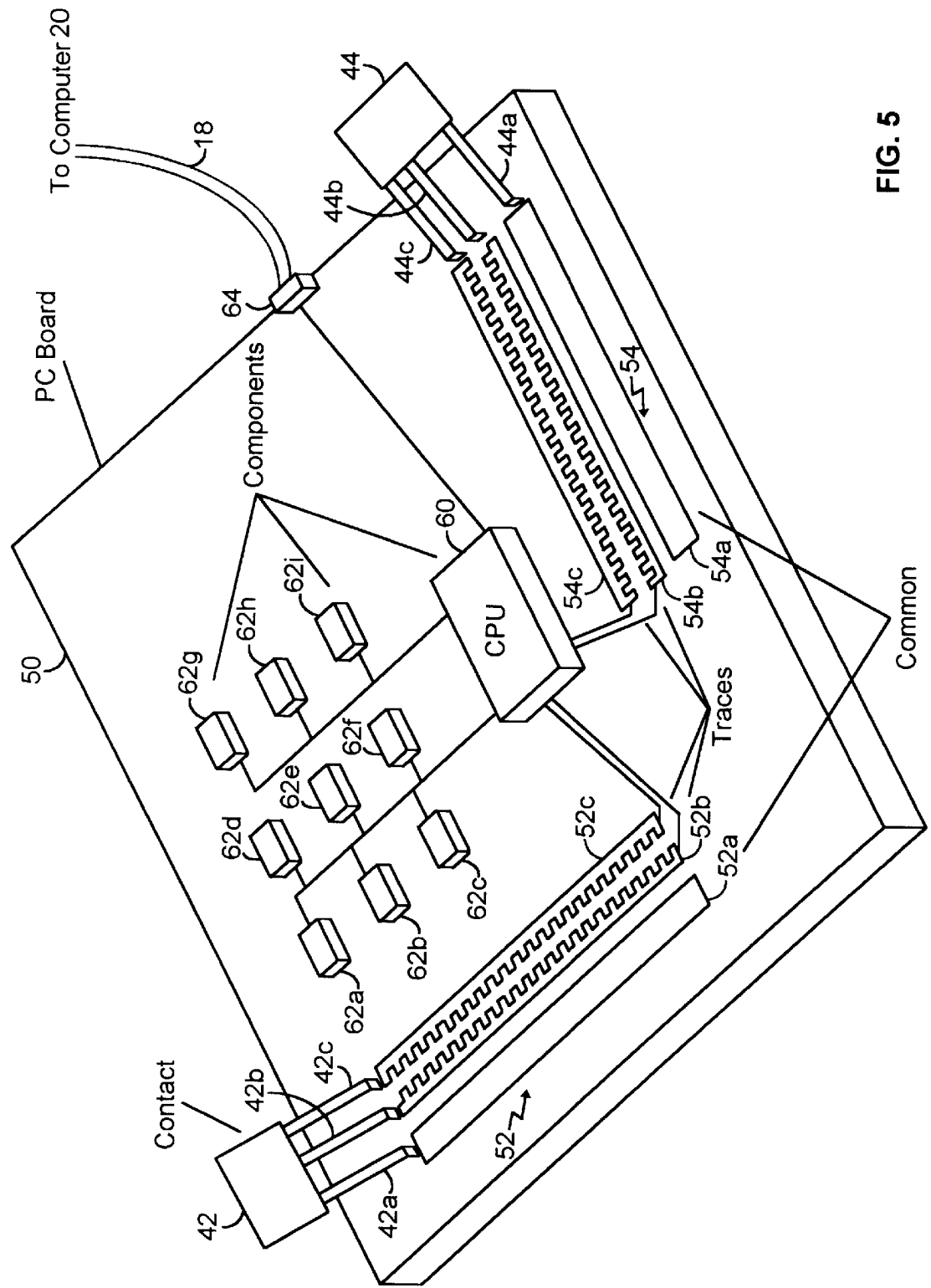
FIG. 5 depicts an internal view of brushes, a printed circuit board and a processor according to an embodiment of the invention.
Figure 6:
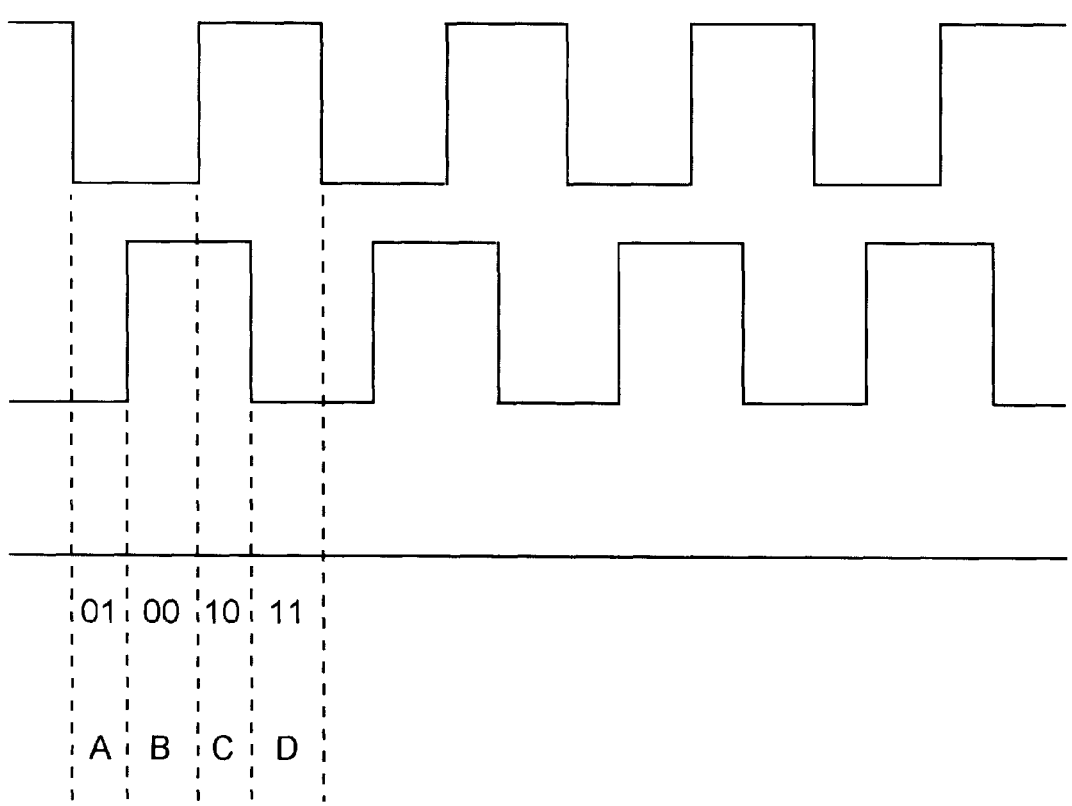
FIG. 6 is a magnified view of a section of the conductive strips on a printed circuit board according to an embodiment of the invention.

FIGS. 5 and 6 depict an internal view of brushes 42 and 44, the printed circuit board 50 and a processor 60 according to an embodiment of the invention. The first brush 42 has three leads 42a–42c and the second brush 44 has three leads 44a–44c. The printed circuit board 50 includes a first conductive strip 52 and a second conductive strip 54 oriented perpendicular to the first conductive strip. These strips 52 and 54 are etched printed circuit patterns or silk-screened conductive patterns. The first strip 52 includes a first sub-strip 52a for ground, a second sub-strip 52b having a plurality of fingers laid on the printed circuit board and a third sub-strip 52c having a having a plurality of fingers laid on the printed circuit board staggered in position with the second sub-strip 52b. The sub-strips 52a–52c contact respective leads of the first brush 42a–42c. The second conductive strip 54 includes a first sub-strip 54a for ground, a second sub-strip 54b having a plurality of fingers laid on the printed circuit board and a third sub-strip 54c having a having a plurality of fingers laid on the printed circuit board staggered in position with the second sub-strip 54b. The sub-strips 54a–54c contact respective leads of the second brush 44a–44c. The sub-strips 52a and 54a are connected to ground. The sub-strips 52b, 52c, 54b and 54c are each coupled to respective pull-up resistors and to inputs to the processor 60.

As the brushes move along the strips, contact is made between the sub-strips. The first strip 52 generates a first sensor signal in response to movement of the first brush 42 on the first strip 52, and the second strip 54 generates a second sensor signal in response to movement of the second brush 44 on the second strip. Specifically, as brush 42 moves along the strip 52, lead 42a is in constant contact with sub-strip 52a. However, lead 42b is in intermittent contact with sub-strip 52b and lead 42c is in intermittent contact with sub-strip 52c. As described above, the sub-strips 52b and 52c are each pulled to a positive voltage through respective pull-up resistors. However, when the lead 42b comes in contact with sub-strip 52b a contact is made between sub-strip 52a and 52b and the voltage on the sub-strip 52b is pulled to ground (the voltage level of sub-strip 52a). The sub-signal on strip 52b (a portion of the first sensor signal) is delivered to the processor 60. Similarly, when the lead 42c comes in contact with sub-strip 52c a contact is made between sub-strip 52a and 52c and the voltage on the sub-strip 52c is pulled to ground (the voltage level of sub-strip 52a). The sub-signal on strip 52c (a portion of the first sensor signal) is delivered to the processor 60. The processor 60 receives the sensor signal from strip 52 and uses that signal to determine the position of the brush 42 on the strip 52.

In the same manner, the second strip 54 generates a second sensor signal in response to movement of the second brush 44 on the second strip 54. Specifically, as brush 44 moves along the strip 54, lead 44a is in constant contact with sub-strip 54a. However, lead 44b is in intermittent contact with sub-strip 54b and lead 44c is in intermittent contact with sub-strip 54c. As described above, the sub-strips 54b and 54c are each pulled to a positive voltage through respective pull-up resistors. However, when the lead 44b comes in contact with sub-strip 54b a contact is made between sub-strip 54a and 54b and the voltage on the sub-strip 54b is pulled to ground (the voltage level of sub-strip 54a). The sub-signal on strip 54b (a portion of the first sensor signal) is delivered to the processor 60. Similarly, when the lead 44c comes in contact with sub-strip 54c a contact is made between sub-strip 54a and 54c and the voltage on the sub-strip 54c is pulled to ground (the voltage level of sub-strip 54a). The sub-signal on strip 54c (a portion of the first sensor signal) is delivered to the processor 60. The processor 60 receives the sensor signal from strip 54 and uses that signal to determine the position of the brush 44 on the strip 54.

The processor 60 is coupled to the first conductive strip 52 and the second conductive strip 54, and is configured to receive the first sensor signal and the second sensor signal to determine a position of the housing 14 with respect to the platform 12. In one embodiment, the processor is configured to receive the first sub-signal from the sub-strip 52b and the second sub-signal from the sub-strip 52c and to determine a direction of movement of the first brush 42 on the first conductive strip 52. This is performed by comparing a phase of the first sub-signal and the second sub-signal. If the phase comparison is positive, the brush 42 is being moved on the strip 52 from left to right, and if the phase comparison is negative, the brush 42 is being moved on the strip from right to left. The processor processes the signals from strip 54 in the same way to determine position and motion.

Referring to FIG. 6, the printed circuit board conductive strips and the staggered positions of the fingers are described. The fingers are made of ¼ or ⅛ oz. copper plated with nickel and gold, and the resolution of the traces can be brought down to 4 mil (0.004 inch) fingers and gaps. Since the two sub-strips are staggered in position as shown in FIG. 6, this provides approximately 500 distinct graduations per inch. Unique data is generated by the strips and will be received by the processor 60 based on the brush position. For example, if the brush is in position A the sub-signals are 01, if the brush is in position B the sub-signals are 00, if the brush is in position C the sub-signals are 10, and if the brush is in position D the sub-signals are 11. This technique provides a high degree of mechanical precision (e.g resolution to 0.002 inch) at very low cost. Moreover, the pressure with which the brushes impress on the conductive strips is controlled by the construction and dimensions of the brushes and the cantilever spring constant.

Once the processor 60 determines the position of the puck, by determining the position of the brushes 42 and 44 on strips 52 and 54, the processor informs the computer of the position and the cursor 26 on the display is adjusted by the computer accordingly. Also, the processor can determine movement direction of the brushes on the conductive strips by comparing the data sequence to a known directional data sequence. For example, a sequence of 01, 00, 10 and 11 means that the brushes are traveling from left to right in FIG. 6. Likewise, a sequence of 11, 10, 00 and 01 means that the brushes are traveling from right to left in FIG. 6.

The processor 60 can further communicate with other components 62*a*–62*i* on the printed circuit board. These components can include switches for buttons that are positioned in the housing or on adjacent locations in order to inform the computer that the cursor movement should be tracked. Also, the processor can inform the computer that the identified position is to be selected for a function such as a hyper-link. These functions are well known in the art.

Advantages of the invention include compact size and a high degree of accurate cursor control.

Having disclosed exemplary embodiments and the best mode, modifications and variations may be made to the disclosed embodiments while remaining within the scope of the invention as defined by the following claims.

What is claimed is:

1. A cursor controller comprising:

a platform having a protrusion thereon;

a housing coupled to said platform and having a structure configured to accept said protrusion, said structure including a first slidable member having a first brush configured to move in response to movement of said housing and a second slidable member having a second brush configured to move in response to movement of said housing;

a printed circuit board disposed within said housing and electrically coupled to said first brush and said second brush and configured to generate a first sensor signal in response to movement of said first brush on a first conductive strip and to generate a second sensor signal in response to movement of said second brush on a second conductive strip oriented perpendicular to said first conductive strip; and a processor coupled to said first conductive strip and said second conductive strip and configured to receive said first sensor signal and said second sensor signal to determine a position of said housing on said platform.

2. The cursor controller of claim 1, wherein:

said first conductive strip includes a first sub-strip having a plurality of fingers laid on said printed circuit board and configured to contact said first brush and to generate a first sub-signal in response to movement of said first brush on said first sub-strip, and a second sub-strip having a plurality of fingers laid on said printed circuit board staggered in position with said first sub-strip fingers and configured to contact said first brush and to generate a second sub-signal in response to movement of said first brush on said second sub-strip;

said second conductive strip includes a third sub-strip having a plurality of fingers laid on said printed circuit board and configured to contact said second brush and to generate a third sub-signal in response to movement of said second brush on said third sub-strip, and a fourth sub-strip having a plurality of fingers laid on said printed circuit board staggered in position with said third sub-strip fingers and configured to contact said second brush and to generate a fourth sub-signal in response to movement of said second brush on said fourth sub-strip; and said processor is configured to receive said first sub-signal and said second sub-signal and to determine a direction of movement of said first brush on said first conductive strip, and to receive said third sub-signal and said fourth sub-signal and to determine a direction of movement of said second brush on said second conductive strip.

3. The compact cursor controller of claim 2, wherein:

said processor is configured to determine a direction of movement of said first brush on said first conductive strip by comparing a phase of said first sub-signal and said second sub-signal, and to determine a direction of movement of said second brush on said second conductive strip by comparing a phase of said third sub-signal and said fourth sub-signal.

4. The compact cursor controller of claim 1, further comprising:

a select switch coupled to said housing and configured to generate a switch signal responsive to downward pressure on said housing.

5. The compact cursor controller of claim 1, wherein:

said platform is approximately 9 cm wide and 8 cm deep; and said housing is approximately 5.7 cm wide, 5.7 cm deep and 1.5 cm high.

6. The compact cursor controller of claim 2, wherein:

said platform is approximately 9 cm wide and 8 cm deep; and said housing is approximately 5.7 cm wide, 5.7 cm deep and 1.5 cm high.

7. The compact cursor controller of claim 3, wherein:

said platform is approximately 9 cm wide and 8 cm deep; and said housing is approximately 5.7 cm wide, 5.7 cm deep and 1.5 cm high.

8. The compact cursor controller of claim 4, wherein:

said platform is approximately 9 cm wide and 8 cm deep; and said housing is approximately 5.7 cm wide, 5.7 cm deep and 1.5 cm high.

9. The compact cursor controller of claim 1, wherein:

said platform is less than approximately 9 cm wide and 8 cm deep; and said housing is less than approximately 5.7 cm wide, 5.7 cm deep and 1.5 cm high.

10. The compact cursor controller of claim 2, wherein:

said platform is less than approximately 9 cm wide and 8 cm deep; and said housing is less than approximately 5.7 cm wide, 5.7 cm deep and 1.5 cm high.

11. The compact cursor controller of claim 3, wherein:

said platform is less than approximately 9 cm wide and 8 cm deep; and said housing is less than approximately 5.7 cm wide, 5.7 cm deep and 1.5 cm high.

12. The compact cursor controller of claim 4, wherein:

said platform is less than approximately 9 cm wide and 8 cm deep; and said housing is less than approximately 5.7 cm wide, 5.7 cm deep and 1.5 cm high.

13. The compact cursor controller of claim 1, wherein:

said first conductive strip is constructed of a plurality of fingers having approximately 500 graduations per inch; and said second conductive strip is constructed of a plurality of fingers having approximately 500 graduations per inch.

14. The compact cursor controller of claim 2, wherein:

said first conductive strip is constructed of a plurality of fingers having approximately 500 graduations per inch; and said second conductive strip is constructed of a plurality of fingers having approximately 500 graduations per inch.

15. The compact cursor controller of claim 3, wherein:

said first conductive strip is constructed of a plurality of fingers having approximately 500 graduations per inch; and said second conductive strip is constructed of a plurality of fingers having approximately 500 graduations per inch.

16. The compact cursor controller of claim 6, wherein:

said first conductive strip is constructed of a plurality of fingers having approximately 500 graduations per inch; and said second conductive strip is constructed of a plurality of fingers having approximately 500 graduations per inch.

17. The compact cursor controller of claim 2, wherein:

said first sub-strip is constructed of a plurality of fingers having approximately 125 graduations per inch, and said second sub-strip is constructed of a plurality of fingers having approximately 125 graduations per inch, and wherein said first sub-strip and said second sub-strip are staggered in position to achieve a combined approximately 500 graduations per inch; and said third sub-strip is constructed of a plurality of fingers having approximately 125 graduations per inch, and said fourth sub-strip is constructed of a plurality of fingers having approximately 125 graduations per inch, and wherein said third sub-strip and said fourth sub-strip are staggered in position to achieve a combined approximately 500 graduations per inch.

18. The compact cursor controller of claim 3, wherein:

said first sub-strip is constructed of a plurality of fingers having approximately 125 graduations per inch, and said second sub-strip is constructed of a plurality of fingers having approximately 125 graduations per inch, and wherein said first sub-strip and said second sub-strip are staggered in position to achieve a combined approximately 500 graduations per inch; and said third sub-strip is constructed of a plurality of fingers having approximately 125 graduations per inch, and said fourth sub-strip is constructed of a plurality of fingers having approximately 125 graduations per inch, and wherein said third sub-strip and said fourth sub-strip are staggered in position to achieve a combined approximately 500 graduations per inch.

19. The compact cursor controller of claim 6, wherein:

said first sub-strip is constructed of a plurality of fingers having approximately 125 graduations per inch, and said second sub-strip is constructed of a plurality of fingers having approximately 125 graduations per inch, and wherein said first sub-strip and said second sub-strip are staggered in position to achieve a combined approximately 500 graduations per inch; and said third sub-strip is constructed of a plurality of fingers having approximately 125 graduations per inch, and said fourth sub-strip is constructed of a plurality of fingers having approximately 125 graduations per inch, and wherein said third sub-strip and said fourth sub-strip are staggered in position to achieve a combined approximately 500 graduations per inch.

* * * * *